United States Patent [19]

White et al.

[11] Patent Number: 4,614,661
[45] Date of Patent: Sep. 30, 1986

[54] METHODS AND APPARATUS FOR SANITARY STEAM INJECTION

[75] Inventors: Donnie R. White, Lawrenceville; David F. Hobgood, Winder, both of Ga.; Larry E. Swim, Dunkirk, N.Y.; Leo D. Staley, Glenview, Ill.

[73] Assignee: Kraft, Inc., Glenview, Ill.

[21] Appl. No.: 714,627

[22] Filed: Mar. 21, 1985

[51] Int. Cl.⁴ .......................... A23L 3/18; F16K 15/00
[52] U.S. Cl. ..................................... 426/511; 99/483; 137/15; 137/541; 137/543; 426/520
[58] Field of Search ............... 426/511, 510, 520; 99/483; 137/557, 329.2, 329.4, 541, 543, 15, 237

[56] References Cited

U.S. PATENT DOCUMENTS

| | | | |
|---|---|---|---|
| 651,793 | 6/1900 | Brown | 137/557 |
| 3,186,430 | 6/1965 | Koutnik | 137/541 |
| 3,951,131 | 4/1976 | Houfek | 426/511 |
| 4,300,923 | 11/1981 | Skoli et al. | 137/557 |

*Primary Examiner*—George Yeung
*Attorney, Agent, or Firm*—Fitch, Even, Tabin & Flannery

[57] ABSTRACT

A steam injection valve for continuously injecting steam into viscous food products such as relishes, sauces, jams and jellies which are continuously pumped through a steam injection zone. The valve has a sanitary irrotational, interlocking valve stem-valve sleeve construction without substantial internal crevices and which has very low maintenance and may be readily assembled and disassembled.

5 Claims, 7 Drawing Figures

METHODS AND APPARATUS FOR SANITARY STEAM INJECTION

The present invention is directed to methods and apparatus for heating of food products by steam injection, and more particularly, is directed to such methods and apparatus which are particularly adapted to the continuous, direct injection of steam into viscous food products under sanitary conditions.

Viscous food products, such as sauces, relishes, jams, jellies, salad dressings and cheese foods are conventionally heated to elevated temperatures prior to blending or packaging, by means of direct continuous injection of steam at superatmospheric pressure into a pressurized stream of the food product. Conventional direct steam injection processing is carried out by continuous introduction of sanitary steam through a steam check valve into a conduit or injection zone through which a pressurized stream of the viscous food product to be treated is also continuously forced, concomitantly with the injection of steam through the steam check valve. Such direct steam injection processing is typically carried out under intense operating conditions, involving high flow rates and intense mechanical or sonic vibration. Such processing also may typically produce potentially irregular pressure fluctuation or cavitation conditions resulting from the intense operating conditions, which conditions are exacerbated by the physical difficulties of mixing the steam with the viscous fluid product. In addition, in such processing, the steam check valve is subjected to impact and thermal stresses upon start up and shut down of a processing run. In view of such processing conditions, substantial difficulties have been encountered in respect to conventional apparatus for continuously introducing pressurized steam into viscous food products. In this regard, conventional check valves have presented problems, over extended time periods, of undesirable wear and breakage of valve components, as well as difficulties in respect to losses of viscous food product upon shutdown of the steam injection and back flow of viscous food products through the steam check valves. Such wear, breakdowns and valve malfunctions have required an undesirably high level of monitoring and repair of breakage of steam inlet valves. Conventional steam injection valves are also responsible for extensive labor costs in the necessary disassembly and cleaning of the processing apparatus to meet high sanitary food manufacturing standards, particularly when the valves have permitted back flow of the viscous food product through the valve. In this regard, the direct steam injection apparatus should function to prevent backflow of the viscous food product into the sanitary steam supply system both under startup and shutdown procedures, as well as continuous operating conditions which may include differential pressure fluctuations across the steam injection valve. In addition, the direct steam injection apparatus should present no crevices, threads or other irregular or convoluted surfaces which are capable of collecting and retaining food solids, yet should be capable of being readily disassembled and reassembled for cleaning and maintenance.

Accordingly, it is an object of the present invention to provide improved methods and apparatus for introducing sanitary steam into a viscous food product. It is a further object to provide sanitary steam check valves having excellent wear characteristics in operation which may be readily assembled and disassembled for maintenance or cleaning, which present only continuous smooth surfaces to the sanitary steam, and which restrain the backflow of viscous food products during operation.

These and other objects of the present invention will be more particularly described by the following detailed specification and the accompanying drawings of which:

Figure 1:
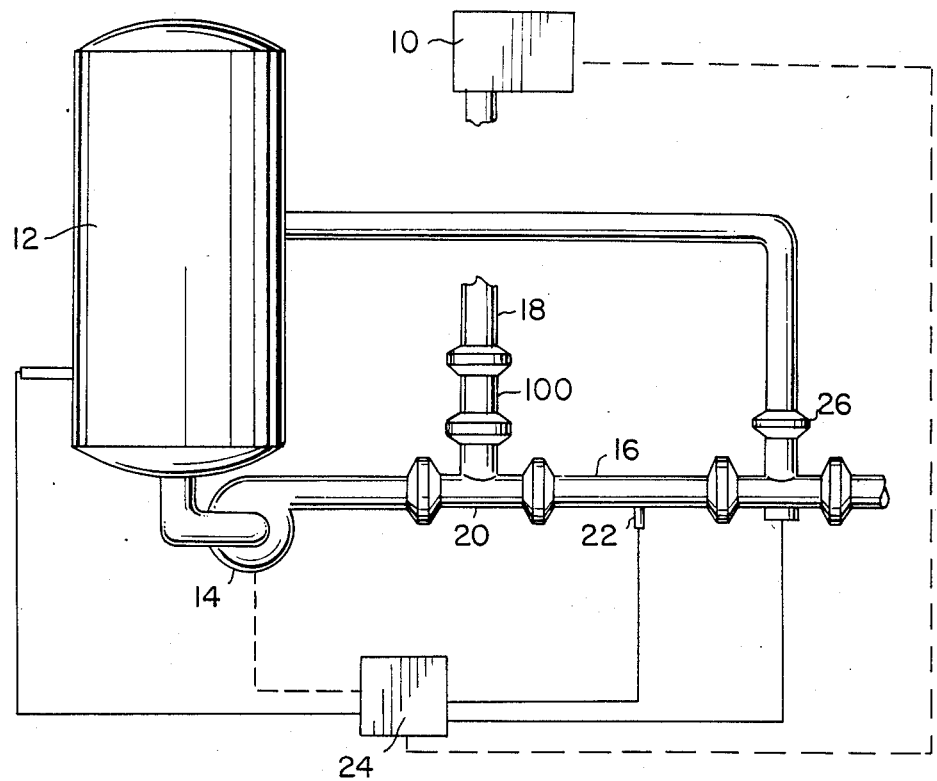
FIG. 1 is a schematic illustration of a direct steam injection system for heating of viscous food products of the type which may utilize a sanitary steam check valve in accordance with the present invention.

Generally the present invention is directed to apparatus for heating of food products by direct sanitary steam injection. In accordance with apparatus aspects of the present invention, sanitary steam injection valves are provided comprising a cylindrical steam inlet conduit provided with first connection means for compressively connecting the inlet conduit in abutting relationship to a steam supply conduit, and a cylindrical valve seat body integrally connected with the cylindrical steam inlet conduit distally of the first connection means. The valve seat body comprises a cylindrical wall section, a valve seat section distally of the inlet conduit, a substantially radially symmetrical frustoconical wall section internally of the cylindrical wall section forming with the cylindrical wall section and the valve seat section a steam discharge chamber within the cylindrical valve body. A valve bearing sleeve is positioned along the rectilinear axis of the cylindrical valve seat body. An important feature of the steam injection valve is the irrotational interaction of the valve bearing sleeve with its associated valve stem, which prevents undesirable wear under intense operating conditions. In this regard, the valve bearing sleeve has a plurality of at least three and preferably four rectilinear guiding surfaces for providing rectilinear motion along the axis of the cylindrical conduit. The valve bearing sleeve has a length along its axis of at least about 2 times its largest cross sectional dimension, and more preferably in the range of from about 2 to about 2.5 times its largest cross sectional dimension.

In addition, the steam injection valve apparatus in accordance with the present invention is provided with a valve element comprising a valve head and a valve stem integrally formed or joined with the valve head and projecting through said valve bearing sleeve. The valve stem extends beyond the valve bearing sleeve distally of the valve head a distance of at least about 60 and perferably at least about 70 percent of the length of the valve bearing sleeve. The valve stem has a plurality of at least three and preferably four rectilinear guiding surfaces which interact with the rectilinear guiding surfaces of the valve bearing sleeve to prevent valve rotation during operation. In the absence of the provision of irrotational valve stem-valve bearing sleeve interaction, the valve would be free to rotate under the influence of the passage of intense, high velocity steam through the valve assembly, thereby producing premature wear and possible breakage, damage or disintegration of the device.

The frustoconical wall projecting inwardly from the cylindrical wall section to separate the steam inlet conduit cylinder from the steam discharge chamber is provided with a plurality of passageways for transmitting steam between the zone internally of said cylindrical steam inlet conduit to the steam discharge zone. The passageways should desirably be distributed radially symmetrically about the axis of the frustoconical wall and should have a cross-sectional area at least about 50 percent and preferably in the range of from about 60 percent to about 70 percent of the area of the cross sectional area of the cylindrical wall section along its longitudinal axis.

The check valve assembly is further provided with a valve compression spring coil having an outside diameter of less than about 50 percent, and preferably less than about 40 percent of the internal diameter of the cylindrical wall section, surrounding the outer wall of the valve bearing sleeve. An important feature of the present invention is the inherently santiary nature of the valve assembly, and relative ease with which it may be assembled and disassembled for cleaning and maintenance or inspection. In this regard, at the end of the valve stem distally of the valve head there is provided a unitary spring compression and retainer element positioned circumferentially about the valve stem end, together with an interlocking compression fastening mechanism positioned within a smooth bore in the valve stem at its end opposite the valve head, for maintaining the spring in compressed relationship against the rearward face of the frustoconical wall section. In closed position, the spring should provide a sufficient compressive force such that at least about 4 psig, and preferably in the range of from about 5 to about 30 psig of steam is required to open the valve from its valve seat. When assembled, one end of the compression spring is retained within a recess in the unitary retention element at its side adjacent the spring. A transverse locking element is positioned through a bore in the valve stem to prevent axial movement of the compression spring cap beyond the bore in a direction along the axis of the valve stem toward its distal end. The transverse locking element is itself positioned within a recess in the compression spring retainer element on its side opposite the compression spring recess, which is forced against the transverse locking element by the compressed spring element positioned between the retainer element and the end of the bearing sleeve, thereby preventing the displacement of the transverse locking pin from the valve stem in a direction orthogonal to the longitudinal axis of the valve stem. The resulting sanitary assembly may be readily disassembled by compressing the unitary compression spring retainer element against the spring to disengage the transverse locking element from the compression spring retainer element, removing the transverse locking element from the valve stem bore, and subsequently removing the valve spring retainer element and the valve spring from the valve stem.

Sanitary steam check valves in accordance with the present invention find particular utility in methods for heating a viscous food product by direct steam injection. In accordance with such methods, a viscous food product to be heated is continuously pumped through a steam injection heating zone at a pressure in the range of from about 30 to about 45 psia, and sanitary steam at a temperature of at least about 310° F. is conducted through the steam check valve at a rate of about 0.04 to about 0.08 pounds of steam per pound of viscous food product. The valve has excellent wear characteristics, and may be readily assembled and disassembled for maintenance or cleaning.

In the manufacture of such steam injection valves, the cylindrical conduit may be welded to the valve seat body and frustoconical wall section including the axial valve bearing. The irrotational valve stem may be inserted through the matching irrotational valve bearing sleeve, the spring is compressively loaded over the valve bearing sleeve with the valve stem projecting through the sleeve, and said valve spring is maintained in a compressed condition by securing the valve stem cap at the distal end of the valve stem by means of the interlocking compression fastening mechanism to maintain a compressive force, sufficient to require a differential pressure of at least about 4 psig across the valve head to open the valve.

Turning now to the drawings, various aspects of the present invention will now be more particularly described with respect to the specific embodiment illustrated in FIGS. 1-7.

Schematically illustrated in FIG. 1 is a direct steam injection packaging system 10 which utilizes a direct injection sanitary steam check valve in accordance with the present invention. In order to provide and promote sanitary conditions, the various components of the system 10 may be constructed of a suitably inert and readily cleanable material such as stainless steel.

In the illustrated steam injection system 10, a reservoir 12 of the food product to be packaged is pumped by means of a sanitary fluid feed pump 14 along a direct steam injection conduit assembly 16. The pump 14 is adapted to pump the viscous food product at an elevated pressure in the range, of for example, about 15 to about 30 psig. Sanitary steam, which has been produced and maintained in appropriately purified condition for food processing utilization in accordance with conventional practice, is provided by sanitary steam supply system 18 at a desired pressure in the range of from about 60 to about 100 psig, and at a temperature of at least about 310° F. The sanitary steam supply 18 includes appropriate controls for providing the steam in the desired temperature range, and for initiating and terminating the steam supply to the heating Tee 20. The sanitary steam check valve 100, as shown in FIG. 1, is incorporated between the heating Tee 20 and the steam supply 18. The temperature of the viscous food product into which the steam has been introduced in the heating Tee 20 may be monitored downstream of the Tee 20 by means of an appropriate temperature measurement device 22 which may be manually read by an operator, and/or which may also provide a data channel input which signals the product temperature to a process controller 24. Downstream of the temperature measurement sensor 22 is a sanitary recirculation valve 26 by means of which the viscous food product may be redirected back to the reservoir 12, or conducted to continuous automatic processing or packaging equipment for sterile packaging of the heated product in accordance with conventional processing or packaging techniques.

In operation, it is desired that the viscous food product conducted to the continuous automatic processing or packaging equipment should be heated to at least a minimum, predetermined temperature such as at least about 175° F., and it may be desirable that the food product be heated to a predetermined, relatively narrow temperature range. In this regard, it is desirable to heat viscous food products within the following ranges:

| Product | Processing Temperature |
| --- | --- |
| Relishes | 175° F. |
| BBQ Sauce | 190° F. |
| Jams & Jellies | 175–200° F. |

If the temperature of the food product downstream of the steam injection Tee 20 has not reached the predetermined, minimum temperature level which is determined to be desirable or necessary for processing of the food product, the recirculation valve 26 is operated while steam is continuously injected into the food stream by means of check valve 100 to direct the heated food stream back into the reservoir 12, so that the temperature of the viscous food product in the reservoir 12 is gradually raised. As the viscous food product stream heated by direct steam injection is recirculated to the holding tank, the temperature of the viscous food product in the tank is progressively increased, so that the temperature of the food product downstream of the point of steam injection is also progressively increased. When the viscous food product reaches the predetermined, minimum processing temperature downstream of the zone of steam injection, the valve 26 may be controlled to cease the recirculation to the tank and to direct the heated food product to the automatic processing or packaging equipment. In this manner, no food product which has not reached the desired, predetermined temperature is permitted to be packaged. While these control aspects may be carried out manually, a suitable process controller 24 may similarly monitor the temperature of the food product in the steam injection conduit assembly 16, and may be adapted to control the operation of the pump 14 and/or the steam supply 18, as schematically illustrated in FIG. 1.

In operation, the steam injection heating system 10 will be thoroughly cleaned to high sanitary food specifications and the viscous food product to be heated and packaged will be introduced into the reservoir 12. The pump will be turned on with the recirculation valve in recirculation position and with the steam check valve 100 in closed position without introduction of steam. Typically the pressure of the food product at the steam injection Tee 20, without steam injection, may be in the range of from about 15 to about 20 psig. The high pressure steam may subsequently be introduced at a pressure of 30 to 55 psig through the sanitary check valve 100. Upon introduction of the high pressure steam into the food product at the steam injection Tee 20, the back pressure exerted on the pump 14 may typically rise by an amount in the range of from about 5 to about 15 psi, to a pressure typically in the range of from about 20 to about 30 psig.

Figure 2:
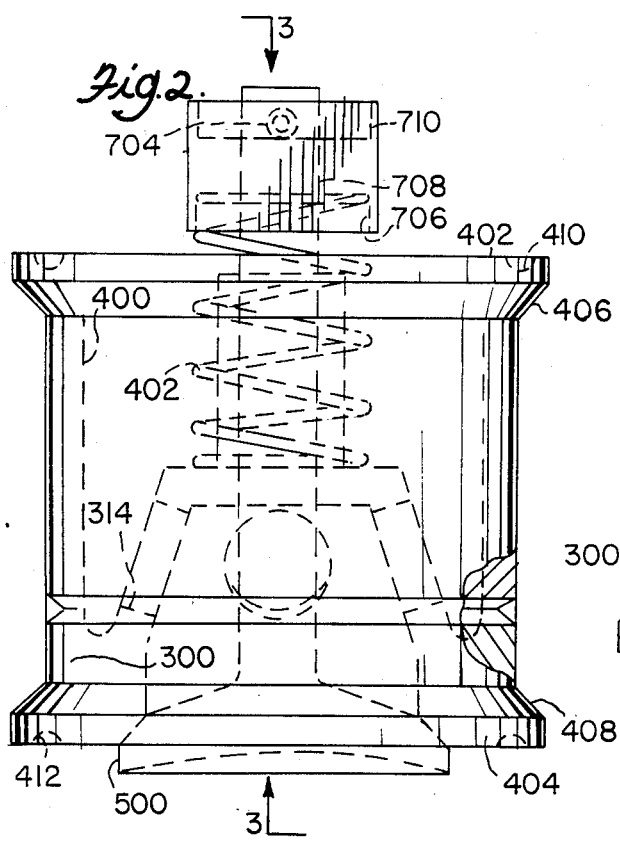
FIG. 2 is a transparent side view of an embodiment of a sanitary steam injection check valve in accordance with the present invention illustrating selected internal features of the valve.

The embodiment of the sanitary steam check valve 100 utilized in the steam injection system 10 is illustrated in FIGS. 2–7. As shown in FIG. 2, which is a transparent side view with selected internal features shown by dashed line, the illustrated steam check assembly comprises a valve assembly 500, a valve seat body 300, and an outer tube or cylinder 400 which is integrally joined with the valve seat body 300. The end joining faces 402, 404 of the valve 10 have tapered, frustoconical end pieces 406, 408 which are adapted to be utilized with a suitable compression clamp (not shown) to connect the respective valve faces 402, 404 with like faces in the steam piping system and viscous food processing apparatus in a fluid-tight manner. In this regard, O-ring recesses 410, 412 are provided in the faces 402, 404 to provide for a compression O-ring seal upon clamping of the faces 402, 404 to like faces with an elastomeric O-ring therebetween.

Figure 3:
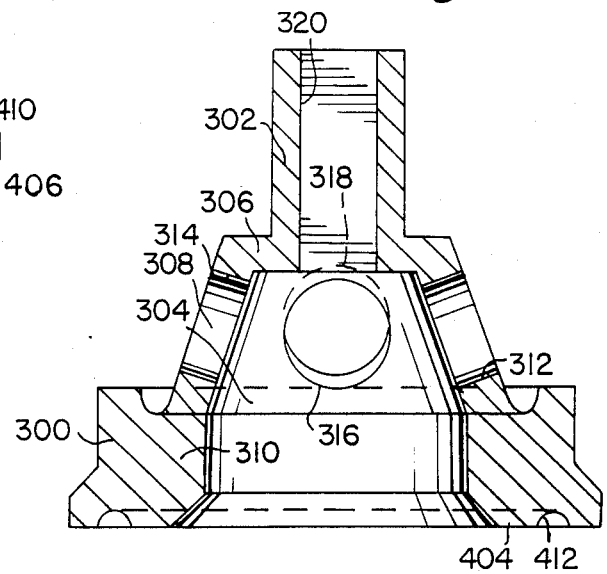
FIG. 3 is a cross sectional side view of the valve seat body of the sanitary steam injection check valve of FIG. 2, taken through line 3—3.

As shown in FIG. 3, the valve seat body 300 comprises a valve bearing sleeve 302 which in the illustrated embodiment has a square cross section having a nominal internal width along each of the square sides of 0.375 inches, and a nominal length of 1.156 inches. The valve seat body further includes a radially symmetric steam transmission chamber 304 formed by integral radially outwardly extending wall 306, frustoconical wall section 308 and cylindrical valve seat and interconnection wall section 310. The frustoconical wall section 308 is provided with a plurality of four steam transmission holes 312, 314, 316 and 318 having a nominal diameter of 0.5 inches, which are radially equally spaced about the central axis of symmetry of the valve seat body 300. The axes of the cylindrical steam transmission holes are respectively each substantially orthagonal to the surface of the frustoconical wall section 308.

In the illustrated embodiment, the effective area of the orifices which communicate into the steam injection recess is in the range of from about 60 to about 65 percent of the cross sectional internal free area of the valve body. This provides an interior zone of pressure reduction which together with the significant compression force exerted by the valve spring, acts to prevent entry of the viscous food product into the steam supply system upon steam supply system shutdown or fluctuation of the pressure of the viscous food product at the point of steam injection, and further may tend to reduce cavitation and vibration within the valve body.

Figure 4:
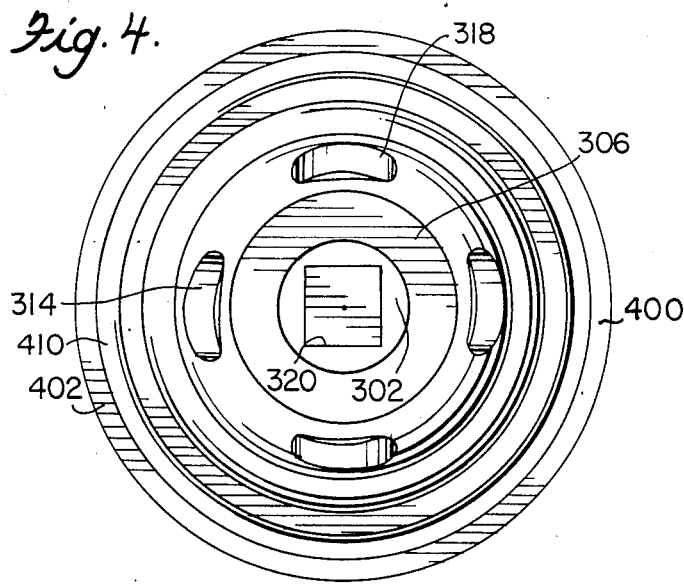
FIG. 4 is an end view of the valve seat body of FIG. 3.
Figure 5:
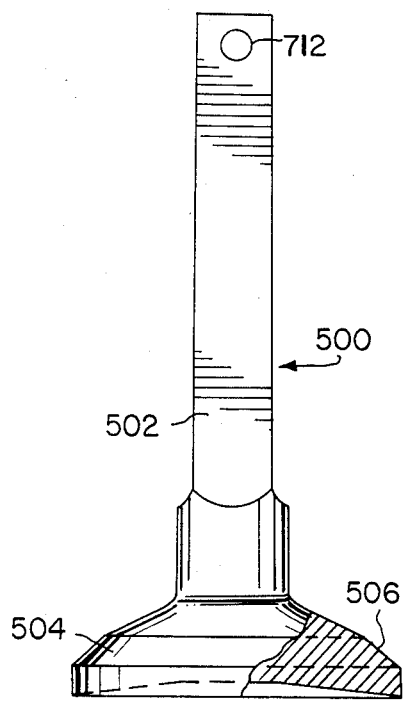
FIG. 5 is a side view of the irrotational valve element of the sanitary steam injection check valve of FIG. 2.
Figure 6:
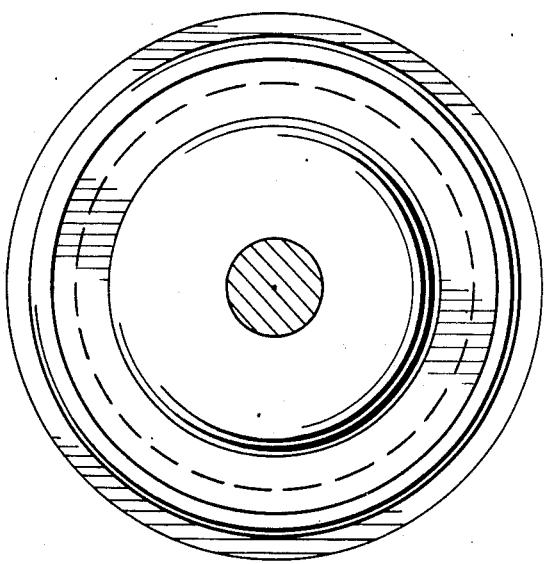
FIG. 6 is an end view of the sanitary steam injection check valve of FIG. 2.

As shown in FIG. 4, the bearing sleeve 302 has an irrotational cross section, which in the illustrated embodiment is a square internal bore 320. The irrotational cross section of the bearing sleeve 302 prevents rotation of the valve, as will be described in more detail hereinafter. The bearing has a length of at least about 3 times its minimum cross sectional dimension. In the illustrated embodiment, the bearing is nominally 1.156 inches long.

Figure 7:
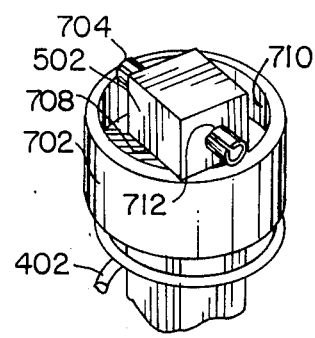
FIG. 7 is a perspective view of the removable valve stem retainer cup and retention pin of the direct steam injection check valve of FIG. 2.

The steam injection apparatus 100 further includes a valve element 500 (FIG. 5) comprising a valve stem shaft 502, a valve head 504 and a valve retainer and spring compression assembly 508 (FIGS. 1, 7). As discussed, the valve 500 has an integral square valve shaft section, which is adapted to guide and restrain the valve 500 in axial motion along the longitudinal axis defined by the valve bearing sleeve 302, while preventing rotation of the valve stem 502 within the sleeve 302. The illustrated valve stem 502 has an outside dimension of 0.370 inches, which is adapted to provide close tolerance with the shaft sleeve 302 of the valve seat body upon assembly of the injection valve 100, as will be described in more detail hereinafter. The length of the square irrotational shaft 502 is substantially longer than the bearing 302 to permit axial movement thereof within restrained, predetermined values.

The valve stem shaft 502 flares at one end thereof to form a radially symmetrical valve head element having a diameter of 1.5 inches. The valve head is provided with a beveled valve seating surface 506 at a 45 degree angle to the longitudinal axis of the valve unit 500, which is adapted to seat against the corresponding valve seating surface of the valve seat body 300. The illustrated valve element 500 is fabricated from stainless steel, with the valve seat body being heat treated at a temperature of 1850° F. for 1.5 hours, air cooled to room temperature and reheated to 325° F. for one hour in order to provide a Rockwell "C" hardness in the range of 45–48.

Illustrated in more detail in FIG. 1 and FIG. 7 is the interlocking valve spring retainer assembly 508 particularly including the sanitary valve assembly/disassembly spring compression retainer element 702 and interlocking pin 704. As shown in FIG. 7, the spring compression retainer element 702 is a unitary cylindrical fastener having a cylindrical recess 706 (FIG. 2) with an internal diameter slightly larger than the outside diameter of the compression spring 402. The compression retainer element 702 has an axial bore 708 of square cross section corresponding to that of the valve stem shaft, such that upon insertion of the shaft through the opening, the retainer cup of the spring is secured in the recess 706 of the spring retainer element. The retainer element is also provided with a recess 710 on its side opposite recess 706 retaining the interlocking split pin element 704. In this regard, the split pin 704 is compressed orthogonally of its axis and inserted through the bore 712 at the end of the valve stem shaft while the retainer element 702 is compressed against the spring to expose the bore 712. Upon releasing the cup, the inserted split pin, which has a length permitting it to be retained within the recess 710, but larger than the length of the bore 712 and the base 708, is locked in position by the retainer cup recess 710 and the action of the split pin end projections. The illustrated compression element 702 may be subjected to substantial impact stresses and is accordingly fabricated from stainless steel and heat treated the same as valve element 500.

In manufacture of the direct steam injection valve assembly 100, the valve stem 502 of the valve element 500 is inserted through the steam input cavity and through the square bearing sleeve 302. The spring 402 is then inserted over the outer portion of the bearing shaft, as shown in FIG. 2, and the retainer element is placed over the end of the valve stem 502, forcing the spring inward. The split roll pin 704 is inserted through the transverse roll pin assembly bore at the distal end of the valve to lock the valve and spring assembly in place within the direct steam injection check valve assembly. The illustrated valve 100 should be loaded with sufficient spring tension to require at least about 5 psi to initially open the valve. The spring is adapted such that at least about 5 psig of steam pressure greater than the pressure on the valve face from the pressurized viscous food product is required to fully extend the valve. In the illustrated embodiment, the travel of the valve from its closed position to its fully extended position is approximately 0.4 inches. Upon full extension of the valve, the proximate surface of the end cup adjacent the valve body shaft surface comes in direct contact with such surface, without placing additional wear or compression or impact upon the spring.

Direct steam injection valves in accordance with the present invention may be utilized in operation for extended periods of time with minimal wear and maintenance expense. In addition, such direct injection valves may be readily disassembled for cleaning, and upon disassembly contain no substantial recesses, crevices, threads or similar surfaces which require meticulous cleaning to maintain sanitary conditions. Accordingly, it will be appreciated that improved direct sanitary steam injection valve systems have been provided in accordance with the present invention, as described hereinabove. While the present invention has been particularly described with respect to the specific embodiment illustrated in FIGS. 1–7, it will be appreciated that various modifications and alterations may be made based upon the present disclosure and are intended to be within the scope of the following claims.

What is claimed is:

1. A sanitary steam injection valve for continuous injection of sanitary steam into a viscous food product comprising a cylindrical steam inlet conduit, first connection means for compressively connecting said inlet conduit in abutting relationship to a steam supply conduit, a cylindrical valve seat body integrally joined with said cylindrical steam inlet conduit distally of said first connection means, said valve seat body comprising a cylindrical wall section, a valve seat section distally of said inlet conduit, a substantially radially symmetrical frustoconical wall section positioned internally of said cylindrical wall section forming with said cylindrical wall section, and said valve seat section, a steam discharge chamber within the cylindrical valve seat body, a valve bearing sleeve positioned along the rectilinear axis of the cylindrical valve seat body, said valve bearing sleeve having a plurality of at least three rectilinear guiding surfaces for providing rectilinear motion along the axis of said cylindrical conduit and having a length of at least about 2 times its largest cross-sectional dimension, a valve element comprising a valve head, a valve stem projecting through said valve bearing sleeve and extending beyond the valve bearing sleeve a distance of at least about 60 percent of the length of the valve bearing sleeve, a valve compression spring coil having an outside diameter of less than about 50 percent of the internal diameter of the cylindrical wall section surrounding the outer wall of the valve bearing sleeve, said frustoconical wall section having a plurality of passageways for transmitting steam between the zone internally of said cylindrical steam inlet conduit to the steam discharge zone, a spring compression retention element positioned on said valve stem at its distal end opposite said valve head and having a first recess in its face adjacent said distal valve stem end and a second recess in its face adjacent said compression spring coil, one end of said compression spring coil being positioned within said second recess, a transverse interlocking compression fastener positioned within a smooth bore in said valve stem adjacent said distal end, said transverse fastener being positioned within said first recess, said valve compression spring coil being compressed between the rearward face of said frustoconical wall section and said second recess to lock said transverse interlocking fastener in said first recess.

2. A sanitary steam injection valve in accordance with claim 1 wherein said valve stem has a plurality of rectilinear guide surfaces which interact with said rectilinear guide surfaces of said valve bearing sleeve to provide for rectilinear motion of said valve stem in said valve bearing sleeve along its longitudinal axis while preventing rotation of said valve stem in said valve bearing sleeve.

3. A sanitary steam injection valve in accordance with claim 1 wherein said compression spring provides a valve opening pressure of at least about 4 psia of steam pressure.

4. A sanitary steam injection valve in accordance with claim 1 wherein said valve compression spring coil has an outside diameter of less than about 40 percent of the inside diameter of said cylindrical wall section, and wherein said plurality of passageways have a total combined area of at least about 50 percent of the cross sectional area of said cylindrical wall section.

5. A method for heating a viscous food product comprising the steps of continuously pumping the viscous food product through a steam injection zone at elevated pressure, continuously injecting steam into the viscous food product in said zone through a sanitary steam check valve comprising a cylindrical steam inlet conduit, first connection means for compressively connecting said inlet conduit in abutting relationship to a steam supply conduit, a cylindrical valve seat body integrally joined with said cylindrical steam inlet conduit distally of said first connection means, said valve seat body comprising a cylindrical wall section, a valve seat section distally of said inlet conduit, a substantially radially symmetrical frustoconical wall section positioned internally of said cylindrical wall section forming with said cylindrical wall section, and said valve seat section, a steam discharge chamber within the cylindrical valve seat body, a valve bearing sleeve positioned along the rectilinear axis of the cylindrical valve seat body, said valve bearing sleeve having a plurality of at least three rectilinear guiding surfaces for providing rectilinear motion along the axis of said cylindrical conduit and having a length of at least about 2 times its largest cross-sectional dimension, a valve element comprising a valve head, a valve stem projecting through said valve bearing sleeve and extending beyond the valve bearing sleeve a distance of at least about 60 percent of the length of the valve bearing sleeve, a valve compression spring coil having an outside diameter of less than about 50 percent of the internal diameter of the cylindrical wall section surrounding the outer wall of the valve bearing sleeve, said frustoconical wall section having a plurality of passageways for transmitting steam between the zone internally of said cylindrical steam inlet conduit to the steam discharge zone, a spring compression retention element positioned on said valve stem at its distal end opposite said valve head and having a first recess in its face adjacent said distal valve stem end and a second recess in its face adjacent said compression spring coil, one end of said compression spring coil being positioned within said second recess, a transverse interlocking compression fastener positioned within a smooth bore in said valve stem adjacent said distal end, said transverse fastener being positioned within said first recess, said valve compression spring coil being compressed between the rearward face of said frustoconical wall section and said second recess to lock said transverse interlocking fastener in said first recess, and periodically disassembling said valve for cleaning by compressing said spring retention element against said spring coil to disengage the transverse fastener from the spring retention element, removing the transverse fastener from the valve stem, and removing the valve spring retention element and spring coil from the valve stem, and subsequently reassembling the steam valve.

* * * * *

UNITED STATES PATENT AND TRADEMARK OFFICE
CERTIFICATE OF CORRECTION

PATENT NO. : 4,614,661

DATED : SEPTEMBER 30, 1986

INVENTOR(S) : DONNIE R. WHITE ET AL.

It is certified that error appears in the above-identified patent and that said Letters Patent is hereby corrected as shown below:

Column 2, line 66, change "preferably" to --preferably--.

Column 3, line 29, change "santiary" to --sanitary--.

Column 3, line 40, change "frustroconical" to --frustoconical--.

Column 6, line 23, change "frustroconical" to --frustoconical--.

Column 6, line 25, change "frustroconical" to --frustoconical--.

Column 6, line 31, change "orthagonal" to --orthogonal--.

Column 6, line 32, change "frustroconical" to --frustoconical--.

Column 7, line 32, change "orthagonally" to --orthogonally--.

Signed and Sealed this

Sixth Day of January, 1987

Attest:

DONALD J. QUIGG

Attesting Officer

Commissioner of Patents and Trademarks